United States Patent Office 3,197,947
Patented Aug. 3, 1965

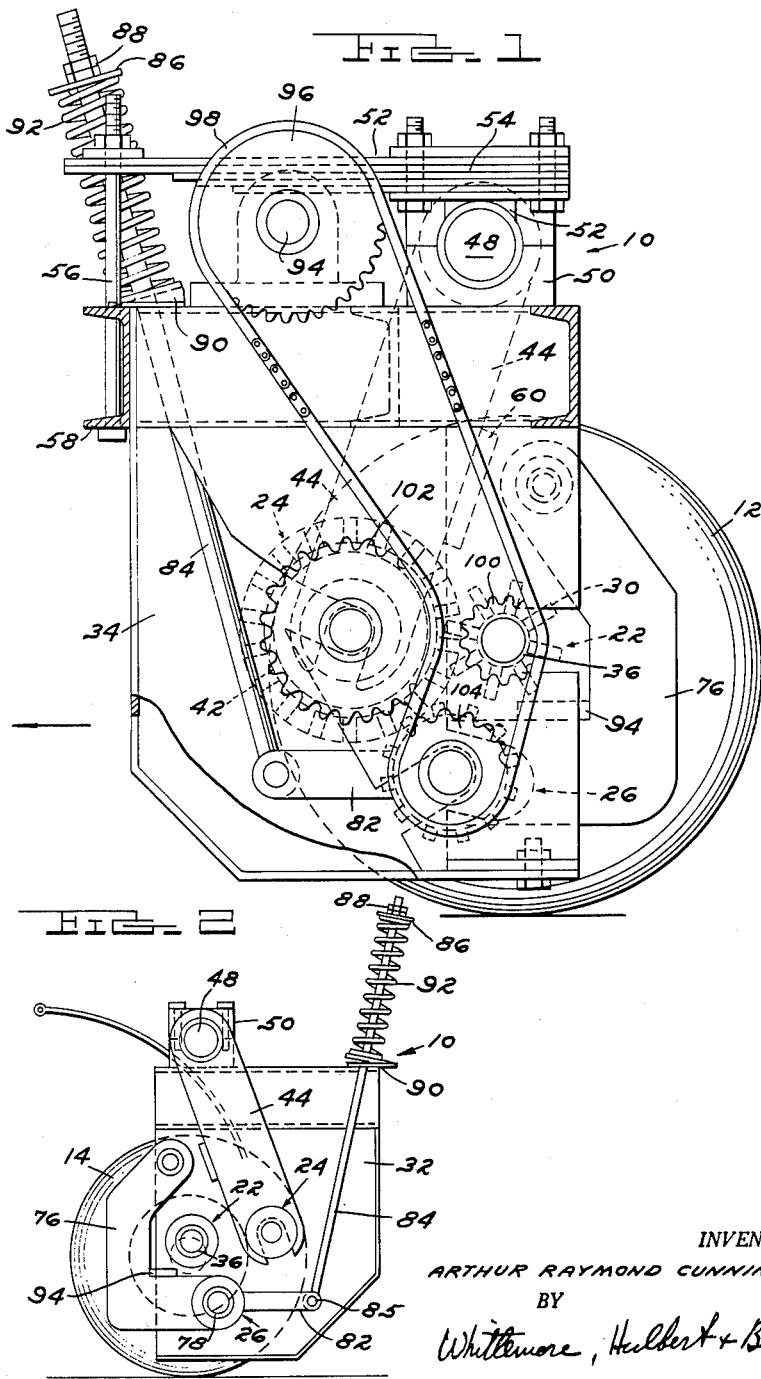

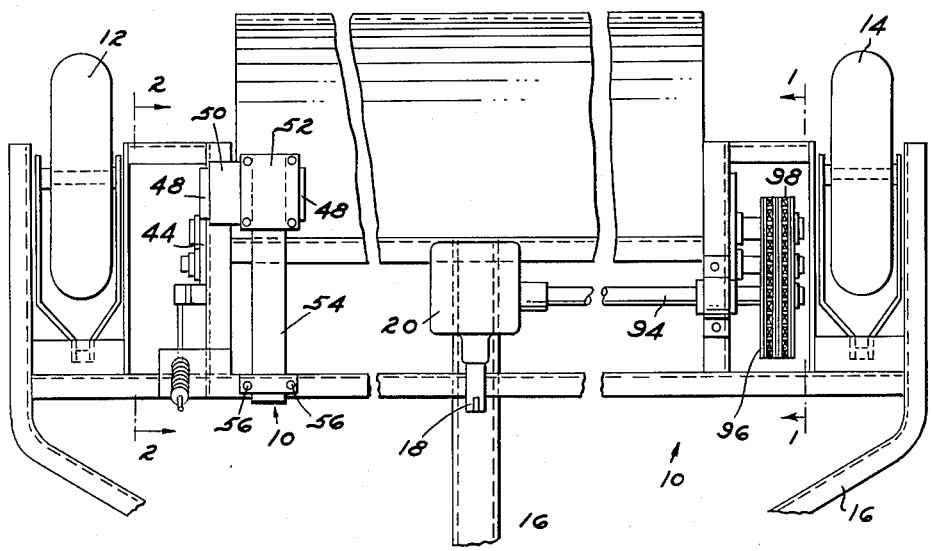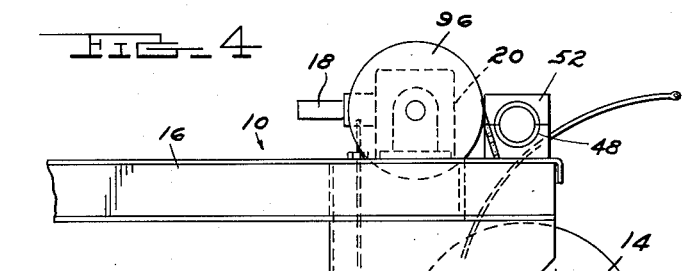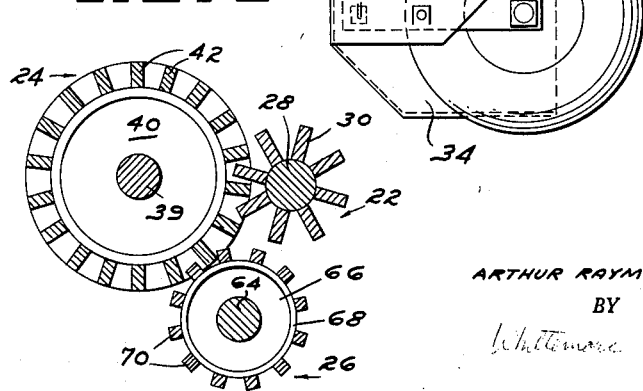

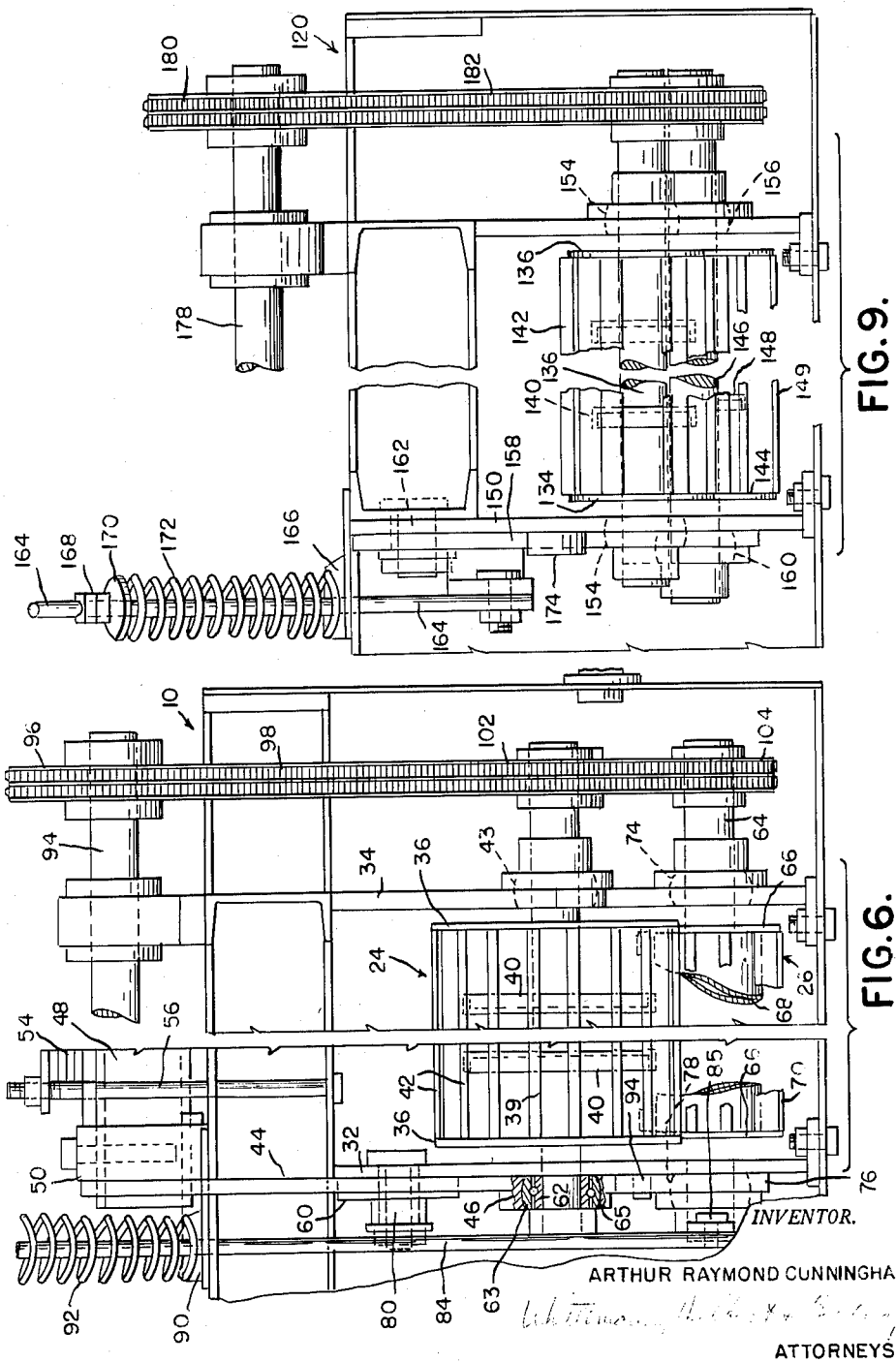

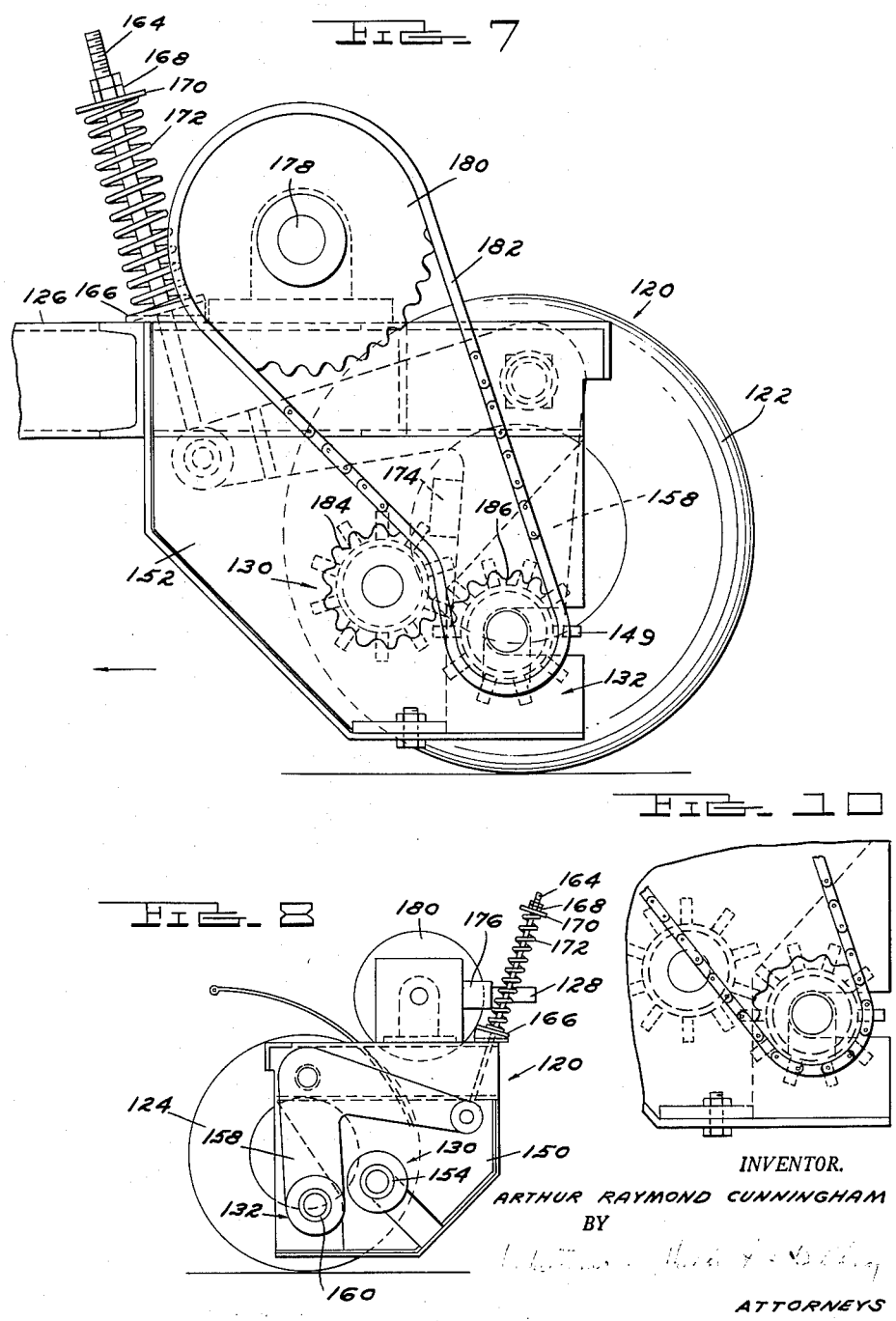

3,197,947
CROP CONDITIONER
Arthur Raymond Cunningham, Chicago, Ill.; Thomas Wayne Cunningham and The First National Bank of Leesburg, executors of said Arthur R. Cunningham, deceased
Filed Mar. 13, 1961, Ser. No. 95,303
9 Claims. (Cl. 56—1)

This invention relates to a crop conditioner adapted to promote the curing of a cut crop by accelerating the release of moisture.

One object of this invention is to provide a crop conditioner composed of substantially parallel rolls mounted on a frame movable over a field on which harvested plant toppings form a layer supported on their stubble, the rolls each having circumferentially spaced flutes or blades which interdigitate with the flutes or blades of the other roll to crack and stretch the stems passing between the rolls.

Prior to conditioning the crop to accelerate the release of moisture, the crop is cut and lays on the field, and usually the crop is accumulated in rows of bunches rather than in an even distribution. This may be due to the manner in which the crop is cut or to raking for example. In the normal operation of the crop conditioner, these accumulations or bunches occur in rows along the right side of the machine. If the conditioner rolls are mounted in fixed bearings, the bunches are apt to foul the rolls and in fact damage to the rolls might result. Accordingly, it is another object of this invention to mount the same end of each roll in bearings which are capable of relative movement toward and away from each other so that the corresponding ends of the rolls may separate to clear large bunches or accumulations of the crop.

Another object is to provide a crop conditioner in which the other ends of the rolls are mounted in fixed bearings so that such roll ends cannot separate, thereby preserving the established flute interdigitation. According to this construction, the rolls may separate at one end to clear the bunches or accumulations of the crop, and the other end of the rolls will maintain the proper interdigitation of the flutes.

Other objects and features of the invention will become apparent as the description proceeds, especially when taken in conjunction with the accompanying drawings, wherein:

FIGURE 1 is a side elevational view of a crop conditioner constructed according to my invention, with parts broken away and in section, and taken substantially on the line 1—1 of FIG. 3.

FIGURE 2 is a semi-diagrammatic view of the other side of the crop conditioner, taken substantially on the line 2—2 of FIG. 3.

FIGURE 3 is a fragmentary top plan view of the crop conditioner.

FIGURE 4 is a side elevational view of the conditioner looking from the right in FIG. 3.

FIGURE 5 is a sectional view showing the flute interdigitation.

FIGURE 6 is a fragmentary view of the crop conditioner looking from the left in FIG. 1, and omitting the wheels on either side.

FIGURE 7 is a view similar to FIG. 1 but showing a modification.

FIGURE 8 illustrates the opposite side of the crop conditioner with the adjacent wheel removed.

FIGURE 9 is a fragmentary view of the crop conditioner looking from the left in FIG. 7, and omitting the wheels on either side.

FIGURE 10 illustrates a modification of the conditioner shown in FIGS. 7–9.

Referring now more particularly to the drawings, the apparatus comprises a main frame 10 carried on right and left hand wheels 12 and 14 which support the frame at a predetermined height above the field over which it is caused to advance, as by means of a tractor or the like (not shown), through the medium of a draft tongue 16. The numeral 18 represents generally a propellor shaft adapted to have a typical connection to the power take-off shaft (not shown) of the tractor, all of which is conventional. The propellor shaft operates a transmission including a gear box 20, etc., for driving the crop conditioner rolls 22, 24 and 26.

The rolls are disposed with their axes substantially parallel and at right angles to the longitudinal center line of the frame which coincides with the direction of advance of the apparatus. The rear roll 22 is composed of a central shaft 28 having radiating therefrom in uniform circumferentially spaced relation a plurality of blades or flutes 30. The blades extend from one end of the shaft to the other and are relatively narrow, the distance between the blades at their tips being substantially greater than the thickness of the blades themselves. The blades or flutes are flat and extend lengthwise of the shaft, the planes thereof extending through the shaft axis. The frame 10 of the apparatus includes a pair of laterally spaced fixed plates 32 and 34 which respectively carry universal self-alignment bearings 36. The bearings 36 are in transverse alignment and rotatably support opposite ends of the shaft 28. The self-alignment bearings 36 will be described more fully hereinafter.

The roll 24 is of substantially larger diameter than the roll 22 and is a cage type roll. End plates 38 are provided at each end of the roll 24, being secured to the shaft 39 thereof. At spaced points along the length of the shaft between the end plates, a plurality of intermediate flute supporting disks 40 are provided. The disks 40 are rigidly secured to the shaft and provide an inner support for the flutes at spaced points along their length. The flutes are generally designated 42 and are in the form of flat blades, the planes of which pass through the shaft axis. The blades extend from one end plate to the other and are disposed radially, being uniformly spaced. The blades 42 are relatively narrow as compared to the circumferential space between the blades at the tips thereof. The blades rest on or are secured to the peripheries of the disks 40. Thus, the roll 24 is in the form of an open cage, the space from the shaft 39 radially outward being open except for the disks 40 and the blades or flutes 42.

One end of the shaft 39 is supported by the fixed frame plate 34 in a universal self-alignment bearing 43. The opposite end of the shaft 39 is supported by an arm 44 in a universal self-alignment bearing 46. The upper end of the arm 44 is secured to a transverse shaft 48. The shaft is parallel to roll 22 and is journaled for free rotation in a bearing 50 carried by a fixed member of the frame 10. A mounting 52 is provided to rigidly secure one end of a leaf spring 54 to the shaft 48. The opposite end of the leaf spring is held down by a pair of rods 56, the upper ends of which are connected to one of the leaves of the spring and the lower ends of which are secured to a fixed frame member 58. The leaf spring 52 is stressed to urge the arm 44 counterclockwise as viewed in FIG. 1 to a limiting position in which the arm engages stop 60 carried by the fixed frame plate 32. In this position of the arm 44 the self-alignment bearings 43 and 46 for the roll 24 are in alignment with one another at right angles to the direction of advance of the apparatus so that roll 24 is parallel to roll 22. However, as will be more fully described hereinafter, the arm 44 may move away from the limiting position of FIG. 1 in a clockwise direction against the tension of leaf spring 52.

The self-alignment bearings 43 and 46 for roll 24 are exactly like the self-alignment bearings 36 for the roll 22. As shown in FIG. 6, the bearing 46 is of the ball type, the inner race 62 engaging the shaft and the outer race 63 having an annular radially outer periphery which is concentric with the axis of the bearing and in longitudinal section is arcuate as shown to fit the similarly formed arcuate recess 65 in the arm 44. Hence the bearing supports the shaft 39 for rotation and permits the shaft to move angularly in any direction.

The lower or pickup roll 26 has a shaft 64, and end plates 66 are rigidly secured to the shaft to provide a mounting for drum 68 which extends between the end plates in concentric relation with the shaft. Hence the drum is rigidly secured to the shaft for rotation therewith. A plurality of blades or flutes 70 extend in uniform circumferentially spaced relation from one end of the drum to the other parallel to the shaft axis. The roll 26 is considerably smaller in diameter than the roll 24 although somewhat larger in diameter than roll 22.

The shaft 64 of roll 26 is supported for rotation at one end by the fixed frame plate 34 in a universal self-alignment bearing 74. The opposite end of the shaft is supported for rotation by an arm 76 in a self-alignment bearing 78. The arm 76 is pivoted to the fixed frame plate 32 by a stub shaft 80 parallel to roll 22. The arm 76 has a reduced extension 82 which is pivotally connected to the lower end of a rod 84 at 85. The upper end of rod 84 has an abutment 86 which is held in predetermined axially adjusted position by nuts 88. The rod 84 extends through a fixed abutment 90 on the frame 10 of the machine, and a compression coil spring 92 encircles the rod between the abutments 86 and 90. The spring 92 tends to swing the arm 76 clockwise, as viewed in FIG. 1, and the limit of such movement is determined by the engagement of the arm with a stop 94 fixed on the frame 10. In this position, the bearings 74 and 78 are in alignment at right angles to the direction of advance of the frame so that the axis of the pickup roll 26 extends parallel to the axis of roll 22. However, as will be described more fully hereinafter, the arm 76 may pivot in a counter-clockwise direction from the FIG. 1 position to separate the rolls at one end.

The rolls 22, 24 and 26 are positively driven from the propellor shaft 18 and gear box 20. The gear box 20 operates a shaft 94, and a sprocket 96 keyed on this shaft drives a chain 98 which engages a sprocket 100 keyed on the shaft of roll 22, engages a sprocket 102 keyed on the shaft of roll 24, and engages a sprocket 104 keyed on the shaft of roll 26. Hence all three rolls are positively driven from the power take-off in synchronism with one another. As viewed in FIG. 1, rolls 22 and 26 turn in a clockwise direction during advance of the machine to the left, and roll 24 turns counter-clockwise.

The rolls are shown in their normal position in which the arms 44 and 76 respectivley engage their limit stops 60 and 94 so that the roll axes extend parallel to one another. The flutes of the roll 22 loosely mesh or interdigitate with the flutes of roll 24 throughout the length of the rolls. The flutes of the pickup roll 26 loosely mesh or interdigitate with the flutes of roll 24 throughout the full length of the rolls, the point of flute interdigitation between rolls 24 and 26 being spaced from that between rolls 22 and 24.

The machine is drawn over a field of previously harvested crops in which crop toppings, including leaves and stems, form a layer supported on their stubble. The pickup roll 26 is at an elevation to receive and pick up the toppings and to feed them into the bite between the interdigitating flutes of the rolls 24 and 26. The toppings are gripped between and deformed by the interdigitating flutes and then fed into the bite between the interdigitating rolls 22 and 24.

As pointed out above, the toppings usually are not uniformly distributed over the field but often occur in rows of bunches which, according to normal crop conditioning procedures, occur along the right hand side of the machine. A bunch or clump of toppings is apt to foul the machine and actually damage the rolls because of the difficulty of passing between the interdigitating flutes. Since experience has shown that these clumps occur almost invariably along one side of the machine, the right side, the right ends of the rolls 24 and 26 are mounted for movement away from the rolls with which they cooperate. Hence the right end of roll 26 can move away from roll 24 so that the flutes thereof, at such end, do not actually interdigitate. Likewise, the right end of roll 24 can move away from rolls 22 and 26 so that the flutes thereof, at such end, do not actually interdigitate with either of the other rolls. The spring 92 imposes less resistance to the movement of arm 76 and its roll than spring 52 imposes upon arm 44 and its roll. Hence an accumulation of toppings entering the bite between rolls 24 and 26 will first produce a separating movement of roll 26 so as not to disturb the interdigitation between rolls 22 and 24.

Despite the opening movement of either or both rolls 24 and 26 at the right hand end, the flute interdigitation is maintained at all times at the opposite end of the rolls, which roll ends are of course carried in bearings secured to the fixed frame plate 34. Hence there will normally be some degree of flute interdigitation from the left end of the rolls toward the right end even when the right end portions are separated. The angular movements of rolls 24 and 26, occasioned by a separation of their right hand end portions do not disturb the chain drive of the rolls through sprockets 100, 102 and 104, that is the chain will not slip over the sprockets since only a very slight movement of sprockets 102 and 104 takes place due to the fact the sprockets are located much closer to the left hand bearings than are the right hand bearings.

After the accumulation or bunch of toppings has cleared the rolls, obviously the spring 52 or 92 will return the separated roll to the normal operative position.

The spaces between adjacent flutes on each roll are sufficiently wide to accommodate the leaves on the toppings so they will not be crushed or deformed during the conditioning operation. The stems, however, will be deformed and transversely cracked and, in fact, stretched by the operation of a flute on one roll moving into the space between adjacent flutes on the other roll. As a flute on one roll moves into the space between flutes of the other roll, the stem of the topping is folded into the pocket and deformed about the end of the flute entering the pocket, cracking the same. At the same time it is gripped and somewhat stretched by the entering flute.

The space between the point of interdigitation of the flutes of rolls 24 and 26 and the point of interdigitation between the flutes of rolls 22 and 24 is less than the length of a normal topping so that the toppings are simultaneously gripped and deformed by the rolls at the two points of flute interdigitation. Moreover, since the interdigitating flutes of rolls 24 and 26, for example, grip the stem at the same time the flute of one of the rolls 22 and 24 is moving into a pocket formed between adjacent flutes of the other roll, a definite stretching of the stem takes place. A stretching also take place due to the gripping of the topping between the rolls 22 and 24 while the deforming action takes place between the flutes of rolls 24 and 26. The stretching of the stems, occurring as it does simultaneously with the deformation thereof, cause the stems to be opened up for a more rapid removal of moisture. The conditioned toppings will pass from the intredigitating flutes of rolls 22 and 24 over the top of roll 22 and return to the swath in a condition that will facilitate a more uniform cure of the topping. The greater proportion of moisture in the stems will be released more readily, so that the stems will cure in about the same time as the leaves, which contain less moisture.

FIGURES 7, 8 and 9 illustrate a modification of the invention in which the machine includes a main frame 120 carried on right and left hand wheels 122 and 124 which support the frame at a predetermined height above the field over which it is caused to advance, as by a tractor (not shown) through the medium of the draft tongue 126. The numeral 128 represents generally a propellor shaft adapted to have a typical connection to the power take-off shaft (not shown) of the tractor. Only two crop conditioning rolls are employed, numbered 130 and 132.

The roll 130 is a cage type roll having the end plates 134 and 136 secured to the ends of shaft 138. At spaced points along the length of the shaft between the end plates, a plurality of intermediate flute supporting disks 140 are provided. The disks 140 are rigidly secured to the shaft and provide an inner support for the flutes 142. The flutes are in the form of flat blades, the planes of which pass through the axis of the shaft. The blades or flutes extend from one end plate to the other and are disposed radially, being uniformly spaced.

The roll 132 is of substantially the same construction having end plates 144 secured to opposite ends of the shaft 146, with flute supporting disks 148 secured to the shaft in spaced relation along the length thereof between the end plates. The flutes 149 are likewise in the form of flat blades whose planes pass through the axis of the shaft. The blades extend from one end plate to the other and are disposed radially, being uniformly spaced.

The blades of the two rolls are relatively narrow as compared to the circumferential space between the blades at their tips. Each roll is in the form of an open cage, the space between the shaft thereof radially outward being open except for the flutes and flute supporting disks.

The shaft 138 of roll 130 is supported by fixed plates 150 and 152 of the frame in universal self-alignment bearings 154 which are of exactly the same construction as the roll bearings described in the first embodiment. The roll axis extends at right angles to the direction of advance of the machine, or to the longitudinal center line thereof.

One end of the shaft 146 of the other roll is supported by frame plate 152 in a universal self-alignment bearing 156 of the same construction as bearings 154, and the other end of the shaft 146 is supported by one arm of a bellcrank lever 158 in a self-alignment bearing 160 also of the same construction as the bearings 154. The bellcrank lever 158 is pivoted to the fixed frame plate 150 at 162, for swinging about an axis parallel to roll 130, and the other arm of the lever is pivoted to the lower end of the rod 164 which extends upwardly and freely through a fixed plate 166 on the machine frame. Nuts 168 thread on the upper end of the rod variably positioning the abutment washer 170 sleeved on the rod to very the compression imposed on the coil spring 172 encircling the rod between plate 166 and abutment 170. Spring 172 urges the bellcrank lever clockwise as viewed in FIG. 7 against the stop 174 on the stationary frame plate 150. In this position, the roll 132 is parallel to roll 130 and the flutes thereof interdigitate with one another throughout the full length of the rolls, as seen in FIG. 7.

The propellor shaft 128 drives a shaft 178 having a sprocket 180 keyed thereto. A chain 182 extends over the sprocket 180 in mesh with sprockets 184 and 186 on the shafts of rolls 130 and 132, respectively, to drive roll 130 counter-clockwise and roll 132 clockwise, as viewed in FIG. 7, during advance of the machine to the left.

Since the right hand end of roll 132 is mounted on a bellcrank lever, this end may separate with respect to the corresponding end of the other roll so that the flutes at this end no longer interdigitate. Hence a clump of toppings along the right side of the machine will more readily pass between the rolls. The spring 172 will quickly return the rolls to parallel relation.

The machine is drawn over a field of a previously harvested crop, and the lower roll 132 is at an elevation to receive and pick up the toppings and to feed them into the bite between the interdigitating flutes of the rolls.

The flutes of these rolls have the same conditioning action on the crop as the flutes of the interdigitating rolls in the first embodiment. Any separation of the roll 132 with respect to roll 130 at the right end of the machine will not disturb the flute interdigitation at the left end of the rolls. In fact, depending upon the amount of separation, the flutes will, over a substantial portion of their length, interdigitate with one another for a thorough conditioning action on the crop. Since the sprockets 184 and 186 are much closer to the bearings supporting the left ends of the shafts than are the right hand bearings, the roll separation will not affect the chain drive, that is the sprockets will not slip over the chain, and hence the proper intermeshing of the flutes will be undisturbed.

FIGURE 10 is a fragentary view showing a modification of the machine illustrated in FIGS. 7–9. The modification of FIG. 10 differs from the machine of FIGS. 7–9 only in that the roll 130 is driven solely by the roll 132 through the interdigitation of their flutes. The chain 182 is connected to the sprocket 186 of the roll 132 to positively drive the same, as in FIGS. 7–9, but the roll 130 does not carry a sprocket and is not, therefore, positively driven by the chain 182. Since the flute interdigitation is at all times maintained, even when the rolls separate at the right hand end far enough so that the corresponding flute ends clear one another, the rolls will at all times be in proper mesh.

What I claim as my invention is:

1. Crop treating apparatus comprising a supporting frame adapted for advance over a field on which previously harvested plant toppings form a layer supported on their own stubble, rolls carried by said frame on substantially parallel axes and each having circumferentially spaced flutes extending generally lengthwise thereof, the flutes of said rolls interdigitating with one another and defining a bite at one side of the point of flute interdigitation to receive toppings, power means for rotating said rolls in directions such that the interdigitating flutes move into said bits, yieldable means supporting corresponding ends of said rolls for rotation on portions of said frame which are relatively movable transversely of said roll axes to permit said corresponding roll ends to move away from each other far enough to withdraw the portions of the flutes at said corresponding roll ends from interdigitating relationship with each other and thereby facilitate the passage of large bunches of toppings between the said portions of said flutes, and means supporting the opposite ends of said rolls for rotation on relatively immovable portions of said frame to thereby preserve the established flute interdigitation at said opposite roll ends irrespective of the relative positions of said corresponding roll ends, said power means being directly connected to each of said rolls at said opposite ends thereof.

2. Crop treating apparatus comprising a supporting frame adapted for advance over a field on which previously harvested plant toppings form a layer supported on their own stubble, at least three rolls carried by said frame on substantially parallel axes and each having circumferentially spaced flutes extending generally lengthwise thereof, the flutes of the first roll interdigitating with those of the second roll and the flutes of the second roll interdigitating with the flutes of the third roll at a point spaced from the point of flute interdigitation of the first and second rolls, said flutes defining bites at the spaced points of interdigitation at the same side thereof to receive toppings, means for rotating said rolls in directions such that the interdigitating flutes move into said respective bites, yieldable means supporting corresponding ends of said rolls for rotation on portions of said frame which are relatively movable transversely of said roll axes to permit said corresponding roll ends of said first and second rolls and of said second and third rolls to move away from each other far enough to withdraw the portions of the flutes at said corresponding roll ends of said first and second rolls and of said second and third rolls from interdigitating relationship with each other and thereby facilitate the passage of large bunches of toppings between the said portions of said flutes, and means supporting the opposite ends of said rolls for rotation on relatively immovable portions of said frame to thereby preserve the established flute interdigitation at said opposite roll ends irrespective of the relative postiions of said corresponding roll ends.

3. The crop treating apparatus defined in claim 2, wherein the said corresponding end of said first roll is supported on a fixed portion of said frame, the said corresponding end of said second roll is supported on a movable portion of said frame, and the said corresponding end of said third roll is supported on another movable portion of said frame.

4. The crop treating apparatus defined in claim 3, wherein the said movable portions of said frame are separate pivotal members.

5. The crop treating apparatus defined in claim 4, wherein the pivotal member associated with said second roll is spring urged toward an operative position for proper flute interdigitation and stop means are provided on a fixed portion of said frame engageable with the last mentioned pivotal member to determine said operative position, and wherein the other pivotal member associated with said third roll is spring urged to an operative position for proper flute interdigitation and stop means are provided on a fixed portion of said frame for engagement with said other pivotal member to determine the operative position thereof, the spring acting upon said other pivotal member being of less strength than the first-mentioned spring.

6. The crop treating apparatus defined in claim 5, wherein the means for rotating said rolls comprises a power device having a direct operative connection with each of said rolls to drive the same independently of flute interdigitation.

7. Crop treating apparatus comprising a supporting frame adapted for advance over a field on which previously harvested plant toppings form a layer supported on their own stubble, rolls carried by said frame on substantially parallel axes and each having circumferentially spaced flutes extending generally lengthwise thereof, the flutes of said rolls interdigitating with one another and defining a bite at one side of the point of flute interdigitation to receive toppings, power means for rotating said rolls in directions such that the interdigitating flutes move into said bite, means supporting corresponding ends of said rolls for rotation, said corresponding end of one of said rolls being supported by said supporting means on a fixed portion of said frame and said corresponding end of the other of said rolls being supported by said supporting means on a portion of said frame which is movable relative to said fixed portion transversely of said roll axes to permit said corresponding roll end of said other roll to move away from said corresponding roll end of said one roll far enough to withdraw the portions of the flutes at said corresponding roll ends from interdigitating relationship with each other and thereby facilitate the passage of large bunches of toppings between the said portions of said flutes, and means supporting the opposite ends of said rolls for rotation on relatively immovable portions of said frame to thereby preserve the established flute interdigitation at said opposite roll ends irrespective of the position of said corresponding roll end of said other roll relative to said corresponding roll end of said one roll, said power means being directly connected to each of said rolls at said opposite end thereof.

8. The crop treating apparatus defined in claim 7, wherein said movable portion of said frame is a pivotal member.

9. The crop treating apparatus defined in claim 8, wherein said pivotal member is spring urged to an operative position for proper flute interdigitation, and wherein stop means are provided on a fixed portion of said frame for engagement with said pivotal member to determine said operative position.

References Cited by the Examiner

UNITED STATES PATENTS

| | | | |
|---|---|---|---|
| 2,304,811 | 12/42 | Frederickson | 56—1 |
| 2,711,622 | 6/52 | Cunningham | 56—1 |

T. GRAHAM CRAVER, *Primary Examiner.*

CARL W. ROBINSON, ARNOLD RUEGG, ANTONIO F. GUIDA, *Examiners.*